(12) United States Patent
Locke

(10) Patent No.: US 12,445,216 B2
(45) Date of Patent: Oct. 14, 2025

(54) PREDICTING TELECOMMUNICATIONS NETWORK PERFORMANCE AT VENUES OF EVENTS

(71) Applicant: T-Mobile USA, Inc., Bellevue, WA (US)

(72) Inventor: Nicholas Andrew Locke, McKinney, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 359 days.

(21) Appl. No.: 18/307,779

(22) Filed: Apr. 26, 2023

(65) Prior Publication Data

US 2024/0364439 A1 Oct. 31, 2024

(51) Int. Cl.
*H04W 24/08* (2009.01)
*H04B 17/373* (2015.01)
*H04W 16/22* (2009.01)

(52) U.S. Cl.
CPC .......... *H04B 17/373* (2015.01); *H04W 16/22* (2013.01); *H04W 24/08* (2013.01)

(58) Field of Classification Search
CPC .... H04B 17/373; H04W 16/22; H04W 16/18; H04W 24/02
See application file for complete search history.

(56) References Cited

U.S. PATENT DOCUMENTS

| | | |
|---|---|---|
| 7,831,384 B2 | 11/2010 | Bill |
| 7,962,797 B2 | 6/2011 | Goldszmidt et al. |
| 8,234,150 B1 | 7/2012 | Pickton et al. |
| 8,964,582 B2 | 2/2015 | Wilkinson |
| 8,966,055 B2 | 2/2015 | Mittal et al. |
| 9,578,519 B2 | 2/2017 | Jaldén et al. |
| 9,590,877 B2 | 3/2017 | Choudhary et al. |
| 9,596,647 B2 | 3/2017 | Bostick et al. |
| 9,762,455 B2 | 9/2017 | Bingham et al. |
| 9,798,984 B2 | 10/2017 | Paleja et al. |
| 9,999,805 B2 | 6/2018 | Ahuja et al. |
| 10,091,679 B1 | 10/2018 | Munar et al. |
| 10,360,127 B1 | 7/2019 | Mcsweeney et al. |

(Continued)

FOREIGN PATENT DOCUMENTS

| | | |
|---|---|---|
| EP | 3516583 B1 | 3/2023 |
| KR | 101566022 B1 | 11/2015 |
| WO | 2017108106 A1 | 6/2017 |

*Primary Examiner* — Kevin T Bates
*Assistant Examiner* — Hector Reyes
(74) *Attorney, Agent, or Firm* — Perkins Coie LLP

(57) ABSTRACT

A method to predict performance of different telecommunications technologies at a venue by obtaining event data of one or more events. The method can identify a geocode and a profile of a venue. The method can generate a coverage heatmap that includes network coverage of the venue by different telecommunications network technologies. The method can identify one or more network access nodes of the different telecommunications networks configured to provide coverage to the venue. The method can predict performance of the different telecommunications network technologies for a particular event indicated in the event data based on performance of the one or more network access nodes. The method can cause display, on a display device, of a performance prediction dashboard including data about the predicted performance.

20 Claims, 5 Drawing Sheets

(56) References Cited

U.S. PATENT DOCUMENTS

| | | |
|---|---|---|
| 10,439,919 B2 | 10/2019 | Coleman et al. |
| 10,448,261 B2 | 10/2019 | Sofuoglu |
| 10,489,711 B1 | 11/2019 | Inbar et al. |
| 10,652,699 B1 | 5/2020 | Poer et al. |
| 10,909,479 B2 | 2/2021 | Walters et al. |
| 10,966,099 B2 | 3/2021 | Vanek et al. |
| 10,992,397 B2 | 4/2021 | Singh et al. |
| 11,012,864 B2 | 5/2021 | Das |
| 11,018,958 B2 | 5/2021 | Tapia |
| 11,023,295 B2 | 6/2021 | Ding et al. |
| 11,223,566 B2 | 1/2022 | Serrano Garcia et al. |
| 11,259,191 B2 | 2/2022 | Chen et al. |
| 11,271,960 B2 | 3/2022 | Bharrat et al. |
| 11,275,488 B2 | 3/2022 | Bettles et al. |
| 11,388,077 B2 | 7/2022 | Shah |
| 11,575,583 B2 | 2/2023 | Hooli et al. |
| 2009/0227251 A1 | 9/2009 | Lei et al. |
| 2013/0218612 A1 | 8/2013 | Hunt |
| 2015/0146616 A1 | 5/2015 | Báder |
| 2016/0302089 A1 | 10/2016 | Schmidt et al. |
| 2018/0025371 A1 | 1/2018 | Perriman et al. |
| 2018/0025373 A1 | 1/2018 | Perriman et al. |
| 2018/0040038 A1 | 2/2018 | Vanslette et al. |
| 2018/0352386 A1* | 12/2018 | Gunasekara ............ H04W 4/33 |
| 2019/0215700 A1* | 7/2019 | Sofuoglu .............. H04W 24/02 |
| 2019/0259033 A1 | 8/2019 | Reddy et al. |
| 2019/0311367 A1 | 10/2019 | Reddy et al. |
| 2019/0318288 A1 | 10/2019 | Noskov et al. |
| 2019/0340704 A1 | 11/2019 | Walters et al. |
| 2020/0404523 A1* | 12/2020 | Yoon .................... H04B 17/318 |
| 2021/0221247 A1 | 7/2021 | Daniel et al. |
| 2021/0377788 A1* | 12/2021 | Yoon ................. H04W 28/0284 |
| 2022/0116265 A1 | 4/2022 | Boyle et al. |
| 2023/0062037 A1 | 3/2023 | Horemuz et al. |

* cited by examiner

PREDICTING TELECOMMUNICATIONS NETWORK PERFORMANCE AT VENUES OF EVENTS

BACKGROUND

A performance indicator or key performance indicator (KPI) is a type of performance measurement. KPIs evaluate the success of an organization or of a particular activity (such as projects, programs, products, and other initiatives) in which it engages. KPIs provide a focus for strategic and operational improvement, create an analytical basis for decision making and help focus attention on what matters most. KPIs define a set of values against which to measure. These raw sets of values, which can be fed to systems that aggregate the data, are called indicators. There are two categories of measurements for KPIs: quantitative facts presented with a specific objective numeric value measured against a standard and qualitative represents non-numeric conformance to a standard, or interpretation of personal feelings, tastes, opinions, or experiences.

Quality of service (QoS) is the description or measurement of the overall performance of a service, such as a telephony or computer network, or a cloud computing service, particularly the performance seen by the users of the network. To quantitatively measure quality of service, several related aspects of the network service are often considered, KPIs such as packet loss, bit rate, throughput, transmission delay, availability, jitter, etc. In the field of computer networking and other packet-switched telecommunications networks, QoS refers to traffic prioritization and resource reservation control mechanisms rather than the achieved service quality. QoS is the ability to provide different priorities to different applications, users, or data flows, or to guarantee a certain level of performance to a data flow. QoS is particularly important for the transport of traffic with special requirements. In particular, developers have introduced Voice over IP technology to allow computer networks to become as useful as telephone networks for audio conversations, as well as supporting new applications with even stricter network performance requirements.

BRIEF DESCRIPTION OF THE DRAWINGS

Detailed descriptions of implementations of the present invention will be described and explained through the use of the accompanying drawings.

Figure 1:
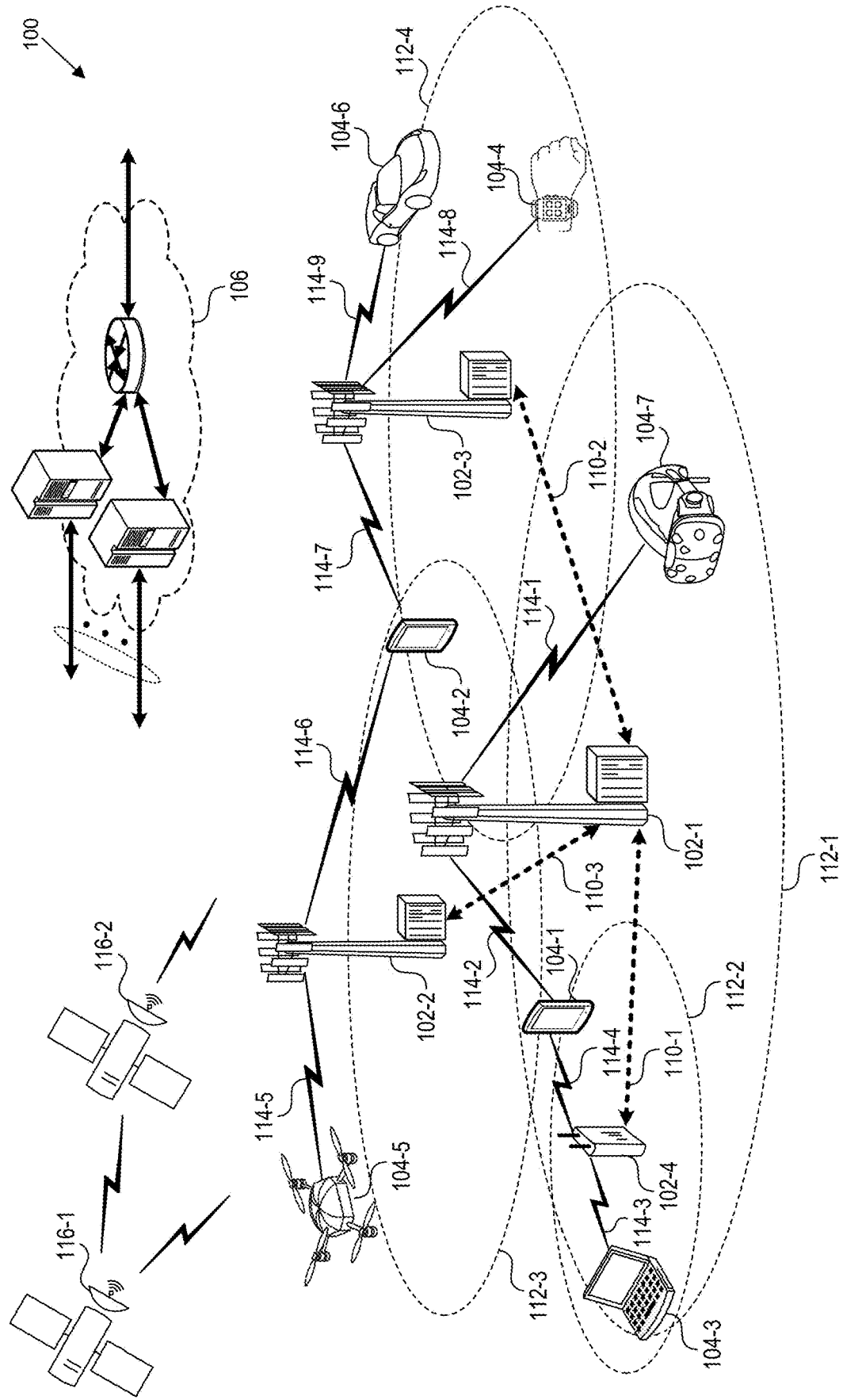
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Being able to monitor and predict telecommunication network performance at events where large quantities of subscribers are present has an impact on the perceived quality of the telecommunications network. If a large quantity of subscriber experiences poor network connectivity simultaneously, there can be a negative perception of the telecommunications network. Being able to predict the network performance can provide time for steps to be taken to ensure good network performance and minimize negative subscriber experience.

Systems predict network performance rely heavily on the manual acquisition of a diagram of the venue (e.g., a floor plan) and manual assessments to identify nearby network access nodes (NANs) of the different telecommunications networks and manual mapping and prediction of the NANs of the different telecommunications networks that can cover sectors of the venue on the diagram of the venue. For example, systems rely on identifying a limited number of events, predicting with limited accuracy the NANs of the different telecommunications networks that can service the corresponding event, and predicting the number of subscribers that will attend the event at the venue. This can be a time-consuming, laborious, and potentially inaccurate method of predicting network performance.

There are manual steps that are performed prior to predicting performance of different telecommunications networks at a venue of an event: 1) a system engineer must identify an event and 2) the system engineer must identify network assets worth monitoring. Additionally, the engineer must manually review all the upcoming events to mitigate poor network performance. However, because of steps 1 and 2 it is often not feasible for the engineer to manually review these steps due to time constraints. Finally, in some instances, the engineer should be able to present the performance of the network to other parties, typically through the use of a manually created performance dashboard.

Not being able to manually review all upcoming events to gather insights and predict network performance can result in limited marketing opportunities (e.g., placing an advertisement at a venue for a telecommunications service for which subscribers are having a poor experience). Furthermore, NANs at extreme congestion scenarios (e.g., sports events or concerts) can be insufficient for the number of expected subscribers but due to the limited bandwidth of the system engineer no mitigating steps can be implemented.

The disclosed technology includes a performance prediction model that can be used to automate most of the manual process described above. A performance prediction model can identify events by obtaining event data that includes an indication of one or more events. The method of obtaining the data can be automated through web scrapers and supplemented by manual entries. The model can also identify network assets worth monitoring, generate a performance prediction dashboard, and report before and after the event respectively.

In one example, the system can identify events that are occurring within 2 days. The system can identify these events using a web scraper and by aggregating subscriber responses to a web portal requesting event details. The system can identify a corresponding venue at a specific location and time for each of the identified events. The system can then identify a geocode and profile of the venue which can include geographic coordinates and a diagram of the venue (e.g., a floor plan). After identifying a list of events and generating corresponding heatmaps for each event, the system can identify the network coverage of the venue by different telecommunications network technologies and identify and generate KPIs for applicable NANs serving the venue.

The system can generate this based on measurements of signal characteristics from handset-reported data, as well as understanding past event performance that exceed performance thresholds. For example, the system can identify various known performance indicators for previous events that exceed a threshold and use the KPIs at past events to generate a prospective prediction of event performance. The measurements from user equipment allow for the creation of coverage heatmaps at the venue. The measurements of signal characteristics used to generate the coverage heatmap can be weighted based on the number of people connected to the network. Furthermore, based on the connectivity, the system can identify NANs of different telecommunications networks (e.g., 4G, 5G) that will serve the subscribers at the identified event. The system can predict the performance of different telecommunications network technologies for a particular event by weighting the KPIs based on the density of subscribers at a venue. This prediction can be used to alter the NANs that subscribers at the venue can access. Alternatively, this prediction can inform the telecommunications provider of weaknesses in the network that can be mitigated.

The KPIs that should be used can vary based on the event venue and the number of subscribers at the event. For example, handset-reported data can be geolocated and represent handsets associated with the telecommunication network for every nine meters. The handset-reported data can be used to identify which network elements are serving the venue and identify the coverage in the venue. Furthermore, the handset-reported data can be used to identify which network elements are important to predict the network performance during the event. The system can pull KPIs for the network element for the event.

In some aspects, the system can obtain event data that includes an indication of one or more events, where each event occurs in a particular venue at a particular location and during a particular time, identify a geocode and a profile of a venue, where the geocode includes geographic coordinates for the venue, and where the profile includes a diagram of the venue. The system can generate a coverage heatmap that includes network coverage of the venue by different telecommunications network technologies, where the coverage heatmap is generated based on measurements of signal characteristics from handset-reported data, and where the measurements are weighted based on bin density of a quantity of subscribers connected to the different telecommunications networks and located in different areas of the building.

The system can identify one or more NANs of the different telecommunications networks that provide coverage to the venue, where the one or more NANs are identified based on the geographic coordinates of the geocode, predicting performance of the different telecommunications network technologies for a particular event indicated in the event data based on performance of the one or more NANs, where the predicted performance includes values for one or more key performance indicators (KPIs) and where the one or more KPIs are weighted based on RRC-connected users at the particular event, and causing display, on a display device, of a performance prediction dashboard, where the performance prediction dashboard includes the coverage heatmap overlayed on the diagram of the venue, an indication of the predicted performance, and the values for the one or more KPIs. The RRC-connected users can include the number of devices or users that are connected to a NAN via the RRC protocol.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of NAN that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Predicting Performance of Telecommunications Network Technologies

Figure 2:
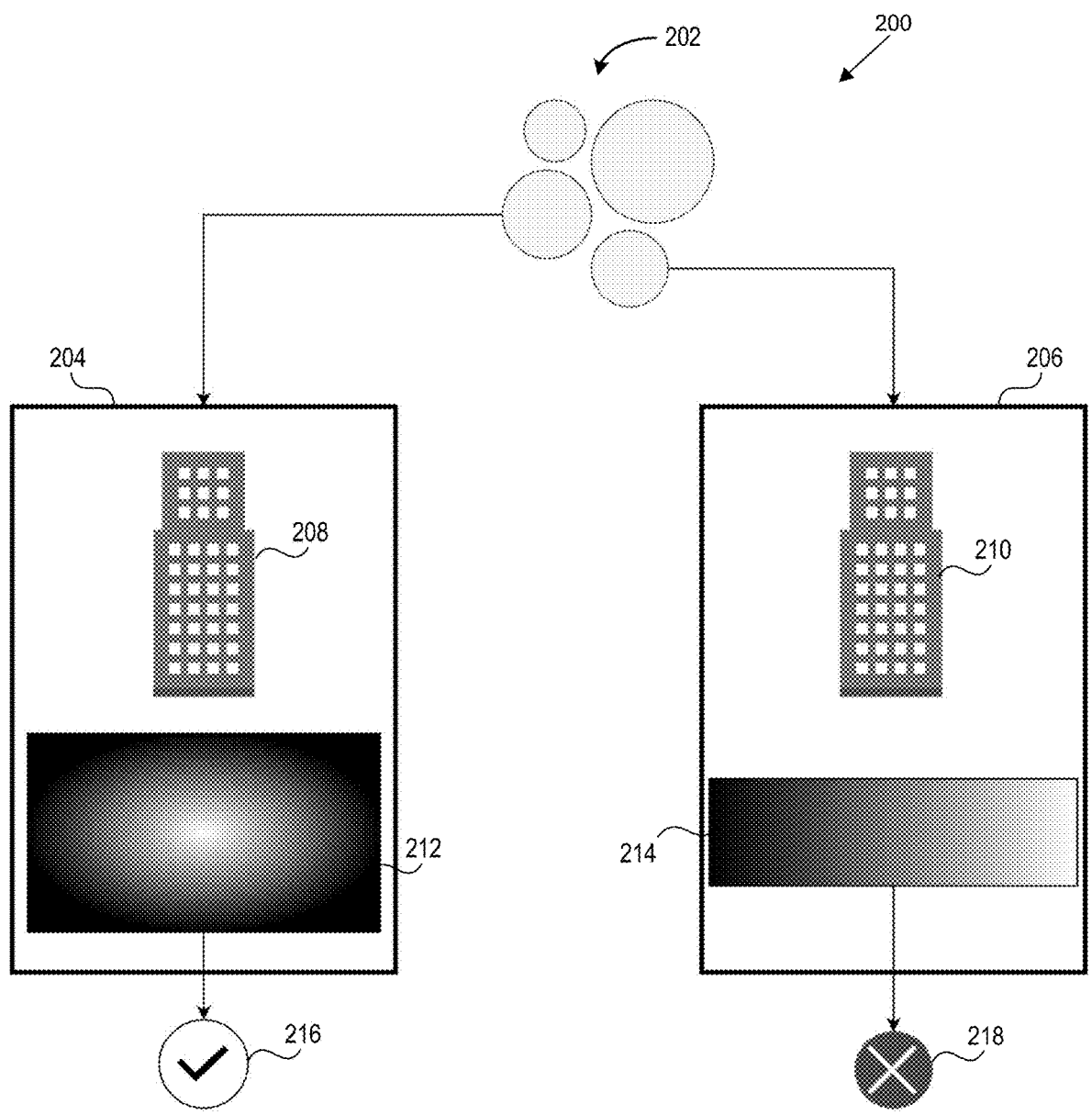
FIG. 2 is a block diagram that illustrates a system that predicts the performance of different telecommunications networks at a venue for an event.

FIG. 2 is a block diagram that illustrates a system that can predict the performance of different telecommunications networks at a venue of an event. System 200 obtains event data that includes an indication of one or more events (e.g., identified events 202). For example, each event can occur in a particular venue (e.g., concert hall, sports arena, or movie theater) at a particular location and during a particular time. System 200 can obtain the event data from sources such as a web scraper. A web scraper can be implemented by a bot or a web crawler. Scraping a web page can involve fetching it and extracting relevant information. The web scraper can identify events in a webpage and use it to predict the performance of different telecommunications networks at a venue. The web scraper can scrape at regular intervals to ensure that the system has the most up-to-date information regarding events.

For each of the events in identified events 202, the system can identify a geocode and a profile of the corresponding venue (e.g., event data 204, event data 206). The geocode can include geographic coordinates for the venue and a diagram. In this disclosure, a geocode can include a code that represents a venue. The geocode can be unique to the event venue and be used to identify it from a set of events with corresponding venues. The geocode can be human-readable, which can aid in a manual review of predicted performance at an event. The geocode can include a country code or postal code. The geocode can include a venue diagram (e.g., a floor plan of the venue).

System 200 can generate a coverage heatmap (e.g., coverage heatmap 212, coverage heatmap 214) that includes network coverage of the venue by the different NANs. For example, coverage heatmap 212 shows good coverage on the perimeter of the venue (e.g., venue 208) and poor coverage in the middle of the venue. Coverage heatmap 214 can show poor coverage on the east side of the venue (represented as the right side of coverage heatmap 214 of venue 210) while there is good coverage on the west side of the venue (represented as the left side of coverage heatmap 214 of venue 210). System 200 can generate the coverage heatmap and serving NANs based on measurements of signal characteristics from handset-reported data. The serving NANs' KPIs can be monitored and performance thresholds can be based on previous events that occurred at the same venue. The performance thresholds can indicate the signal characteristics that exceed the threshold which can indicate that users will experience poor network performance (high latency, low throughput, or high jitter). The measurements of signal characteristics can be weighted based on the number of subscribers connected to the different telecommunications networks (e.g., bin density or RRC Users). The coverage heatmap can be used to predict network performance at a venue (e.g., expected good performance indicator 216 or expected poor performance indicator 218).

As used herein, a heatmap (e.g., coverage heatmap 212 or coverage heatmap 214) can refer to a visualization of network coverage overlaid onto a venue diagram. The heatmap can show expected or actual network quality of an event. The heatmap can be a gradient of two or more colors representing network quality at a venue in two dimensions. The variation in color can be by hue or intensity, giving obvious visual cues to a human about how the network quality is clustered or varies over space which can be helpful in post-analysis after an event (e.g., in a performance dashboard). The signal characteristics can be used to generate KPIs. Furthermore, the heatmap can display KPIs for each zone in the venue. For example, if coverage heatmap 212 corresponds to a stadium with a zone in the center for the field and zones on the perimeter corresponding to seating, coverage heatmap 212 shows good coverage and quality in the seats but poor coverage and quality on the field. This determination can be based on one or more KPIs. The system can predict that the network performance at the venue will be good based on expected good performance indicator 216 because the field had fewer subscribers than the seats as shown by the RRC data on the busiest day including the venue and thus most subscribers will experience good network performance.

System 200 can identify one or more NANs of the different telecommunications networks configured to provide coverage to the venue, where the one or more NANs are identified based on the coordinates of the geocode corresponding to the geographic coordinates for the venue. For example, there can be a radius around the venue based on the transmission distance of different telecommunications networks. The system can also identify one or more NANs of the different telecommunications networks configured to provide coverage to the venue by using handset-reported data (e.g., third-party data corresponding to communication data from UE devices). The handset-reported data can be geolocated and used to identify which network elements are serving the venue.

System 200 can predict the performance of the different telecommunications network technologies for a particular event indicated in the event data based on the performance of the one or more NANs, where the predicted performance includes values for one or more KPIs, and where the one or more KPIs are weighted based on RRC-connected users at the particular event. As used herein, telecommunications network technologies can include, for example, NANs at a venue to facilitate access to various network generations such as 4G or 5G.

System 200 can optionally cause display, on a display device, of a performance prediction dashboard, where the performance prediction dashboard includes the coverage heatmap overlayed on the diagram of the venue, an indication of the performance prediction, and/or the values for the one or more KPIs.

Identifying events can include identifying extreme congestion scenarios. To identify extreme congestion scenarios, the system can determine a threshold based on previous events at the venue. For example, if poor network experience was observed at a venue with 300 UE devices three months prior to the current event, the system can set the threshold at a number below 300. The system can also tag events (e.g., identified events 202) as extreme congestion scenarios to prioritize manual review prior to the event and after determining that a capacity at the venue will be exceeded. Manual review can include adding more NANs in strategic locations to improve the coverage of the venue. Network performance at events hosted at the same venue in the past can inform network performance for future events at the same venue.

Generating the performance prediction can include segmenting the diagram of the venue into one or more zones. The diagram can be a floor plan of a stadium and the zones can be a certain portion of the diagram (e.g., the seats, concourse, or field). Furthermore, each zone can have access to specific NANs surrounding the venue, when generating the performance prediction, the system can calculate performance metrics such as a throughput metric (e.g., the rate of packet delivery in the telecommunication network) in each of the zones by getting the performance data from each NAN in the zone and aggregating the performance data. In order to tailor the data to the event, the system can weight the aggregated performance data using a radio resource control (RRC). This same process can be applied to any KPI.

Generating the measurements of signal characteristics for the performance prediction can include identifying a particular type of day such as the busiest day. The particular type of day can be a calendar date within a time period that represents the day at a venue with the highest number of subscribers or user density. The particular type of day and other days similar in scope can be used as a baseline to establish how the network performs under stress. Furthermore, the system can identify KPI data from the NANs on the particular type of day and use the KPI data of the busiest days as the measurements for the performance prediction. By doing so, the system can generate a coverage heatmap based on the performance prediction representative of the network under load (e.g., as is the case during most events, especially those with extreme congestion scenarios indicating a high subscriber density at the venue during the event).

System 200 can identify the latest network coverage including weighting a reference signal received power (RSRP) sample based on the busiest day at the venue, where the RSRP data is a received power level. The RSRP data can be used to determine a KPI. Specifically, a KPI corresponding to the RSRP sample in a venue can indicate poor signal reception on user equipment (e.g., an average of −100 decibel milliwatts (dBm) on UE) or good signal reception on UE (e.g., −20 dBm on UE). Furthermore, in order to provide an aggregate coverage KPI of the venue, the measured RSRP samples can be weighted based on the number of subscribers geolocated throughout the venue (which can be determined by geolocated handset-reported data). Weighting an RSRP sample can also be based on the most recent days at the venue.

Furthermore, identifying KPI data of the busiest day can include weighting a signal-to-interference-plus-noise ratio (SINR) sample based on the busiest day at the venue, where the SINR is a theoretical maximum rate that information can be transferred between a wireless device and a NAN. For example, the weighted SINR sample can be used to identify an aggregate KPI of network quality on the busiest day that can inform the network prediction. Weighting an SINR sample can also be based on most recent days at the venue.

Identifying the KPI data of the busiest day can further include weighting throughput based on the busiest day at the venue, where the throughput is an actual rate at which information is transferred. Throughput can be limited by the available bandwidth of the network as well as other limiting factors such as the available signal-to-noise ratio and hardware limitations. For example, the throughput at an extreme congestion event can be low due to various limiting factors (e.g., suboptimal building layout, location in the venue) which can result in a poor user experience.

Identifying the KPI data of the busiest day can further include weighting latency based on the busiest day at the venue. In the present disclosure, latency can be a delay between a sender sending a packet and a receiver decoding it. For example, if a sender sends a packet and it is routed inefficiently there can be an increase in latency. Alternatively, if a sender sends a packet and the receiver decodes it without causing a noticeable lag, the latency can be considered low.

Identifying the KPI data of the busiest day includes weighting jitter based on the busiest day at the venue, where the jitter is a variation in packet delay at a receiver. Furthermore, at an extreme congestion event, there can be high jitter based on the material composition of the venue (e.g., a stadium can have concrete that interferes with signal transmission and causes jitter). Jitter can also be caused by faulty hardware or other forms of signal interference. Jitter can be a very important KPI as high jitter can severely impact the call quality of telephony which is very noticeable for subscribers.

Identifying the KPI data of the busiest day includes weighting error rate based on the busiest day at the venue, where the error rate is a frequency at which errors occur in data transmission between a wireless device and a NAN. The error rate can be impacted by channel noise as is the case at high-congestion events. The error rate can also be impacted by signal interference which can also be the case at high congestion events.

The system can increase the accuracy of the generated coverage heatmap by identifying a date of a recent network upgrade and incorporating it into the historical baselining. The recent network upgrade can describe a modification to the network that results in an increase to a KPI. For example, the recent network upgrade could be a new NAN that serves the venue, thereby increasing network performance and subsequently showing improvements through the KPIs. After identifying the date of a recent network upgrade the system can reset the performance baselining based on KPI after the date of the recent network upgrade which prevents any outdated information from being used to generate the performance prediction. By doing this, the system can generate a performance prediction based on the most recent information thereby increasing accuracy.

The system can obtain event data that includes an indication of one or more events by using a web scraper to identify events. The web scraper can identify a target webpage that contains event data (e.g., a local listing of events or results from a specific query to a search engine). The web scraper can extract details about the event from the target webpage. Furthermore, the event details can include information about an event contained in event data including a particular venue at a particular location and during a particular time. The system can, by using the web scraper, generate a set of events based on the events that are occurring within a time period and store the set of events as the event data. By doing so, the system can provide performance predictions for each event, therefore, covering many more events than would be possible by hand.

The system can further edit, update, and refine the event data as event details are prone to change over time. The web scraper can manage changes to event details which can include information about an event including location, date, and time. By doing this, the system can ensure more accurate event details than would be possible by manual event identification.

In addition, the system can categorize the events as major or minor by using some of the available information that was collected: 1) If an in-building solution exists or is planned, 2) The handset density collected within the profile, 3) The type of building that the event is occurring (i.e., stadiums and theaters could indicate major events). This categorization can filter the number of events to the most appropriate list, reduce the processing of the system, and avoid unnecessary reporting on minor events.

The system can further obtain event data by aggregating data submissions to identify events. Specifically, the system can receive events from various entities (e.g., event calendars from organizations or individuals submitting local events). The system can then generate a set of events based on the events from the plurality of entities and store them as event data. By doing so, the system can provide performance predictions for smaller events and ensure the accuracy of event data from larger organizations.

Figure 3:
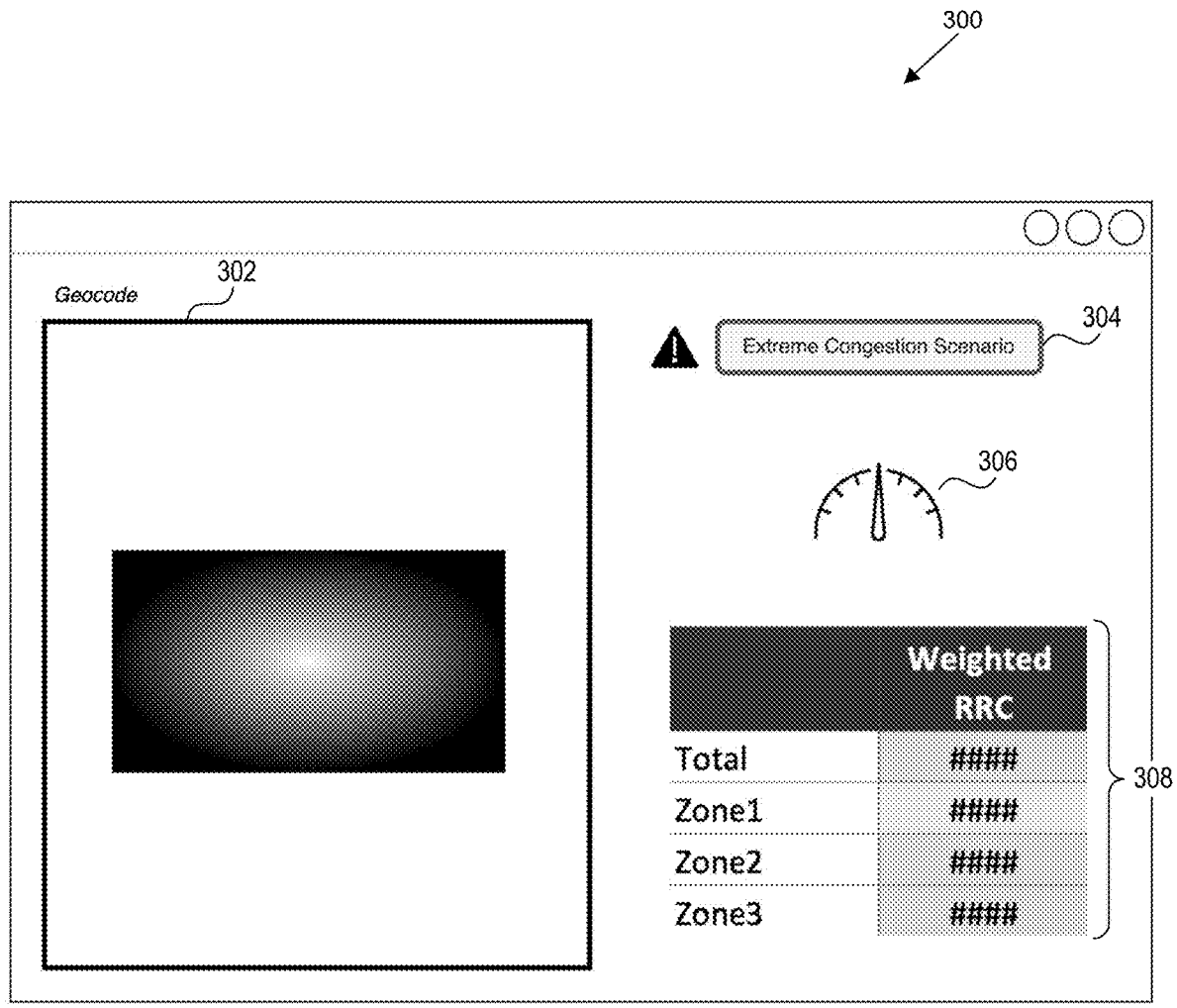
FIG. 3 is a block diagram that illustrates a performance prediction dashboard with the results of the system that predicts the performance of different telecommunications networks at a venue for an event.

FIG. 3 is a block diagram that illustrates a performance prediction dashboard with the results of the system that predicts the performance of different telecommunications networks at a venue corresponding to an event. Display 300 can show the predicted coverage heatmap overlayed on the diagram of the venue (e.g., coverage heatmap 302), an indication of the performance prediction (e.g., performance prediction 306), and values for one or more KPIs (e.g., busiest day KPIs 308). Busiest day KPIs 308 can include a table comprising a list of zones corresponding to the event venue on the busiest day. Specifically, the zones can correspond to portions of the venue diagram. Busiest day KPIs 308 can also include an aggregated KPI, weighted using RRC to take into consideration the number of subscribers at an event hosted at the venue on the busiest day.

The system can determine a threshold based on previous events at the venue (e.g., busiest day KPIs 308). The system can also tag events as extreme congestion scenarios (e.g., extreme congestion scenario tag 304) to prioritize manual review after determining that a threshold capacity at the venue will be exceeded. This can be helpful in determining where to focus efforts and funds in improving the network.

Generating the performance prediction (e.g., performance prediction 306) can include segmenting the diagram of the venue into one or more zones. The diagram can be a floor plan of a stadium and the zones can be a certain portion of the diagram (e.g., the seats, concourse, or field). Furthermore, each zone can have access to specific NANs surrounding the venue. When generating the performance prediction, the system can calculate a KPI in each of the zones by getting the relevant data from each NAN in the zone and aggregating the data. In order to tailor the data to the event, the system can weight the aggregated performance KPIs using a radio resource control (RRC). The performance prediction can be an integer. Additionally, the performance prediction can be converted into a visual indicator for improved human readability (e.g., performance prediction 306).

After the event lapses, the system can generate a performance review dashboard based in part on the performance prediction dashboard. The performance review dashboard can include an actual coverage heatmap based on handset-reported data and KPIs from NANs during the event. The actual coverage heatmap can show the deviation from the heatmap on the performance prediction dashboard which can indicate how useful the selected KPIs were in determining network performance at an event. The performance review dashboard can also include an actual performance record and the one or more KPIs used to make the determination. Generating the performance review dashboard can be a laborious manual process. However, generating the performance review dashboard can be instrumental in determining future operation strategies including where to place new NANs to improve the telecommunications network. Additionally, the review dashboard can inform where to target future sponsorship and marketing opportunities for the business.

Furthermore, after the event lapses, the retrospective performance of each event (e.g., data summarized in individual performance prediction dashboards) can be collected the day after the event occurs and summarized in a dashboard. Major events can be aggregated and transmitted to various entities including the party that hosted the event. The reports regarding major events can include a summary of the event's performance in a simplified format (e.g., just a heatmap and the performance indicator).

The system can automatically detect the hours of the event based on the collected user KPIs. The automatically detected hours can be aggregated when summarizing the retrospective performance of each event. This automatic detection can solve two things: 1) Any errors in the listed times of the web scraped event can be avoided, and 2) the period before and after the event where ingress and egress are occurring can be included in the overall event performance.

The system can identify the hours that events are occurring by measuring the user KPIs of the event and identifying the busiest hour. After identifying the busiest hour, the system can determine a threshold based on an offset from the busiest hour (e.g., 9:00 am-5:00 pm at an office building is a busy time indicated by the identified busiest hour, 1:00 pm, with an offset of 4 hours). The system can compile a list of all the hours that are within the threshold and offset.

Figure 4:
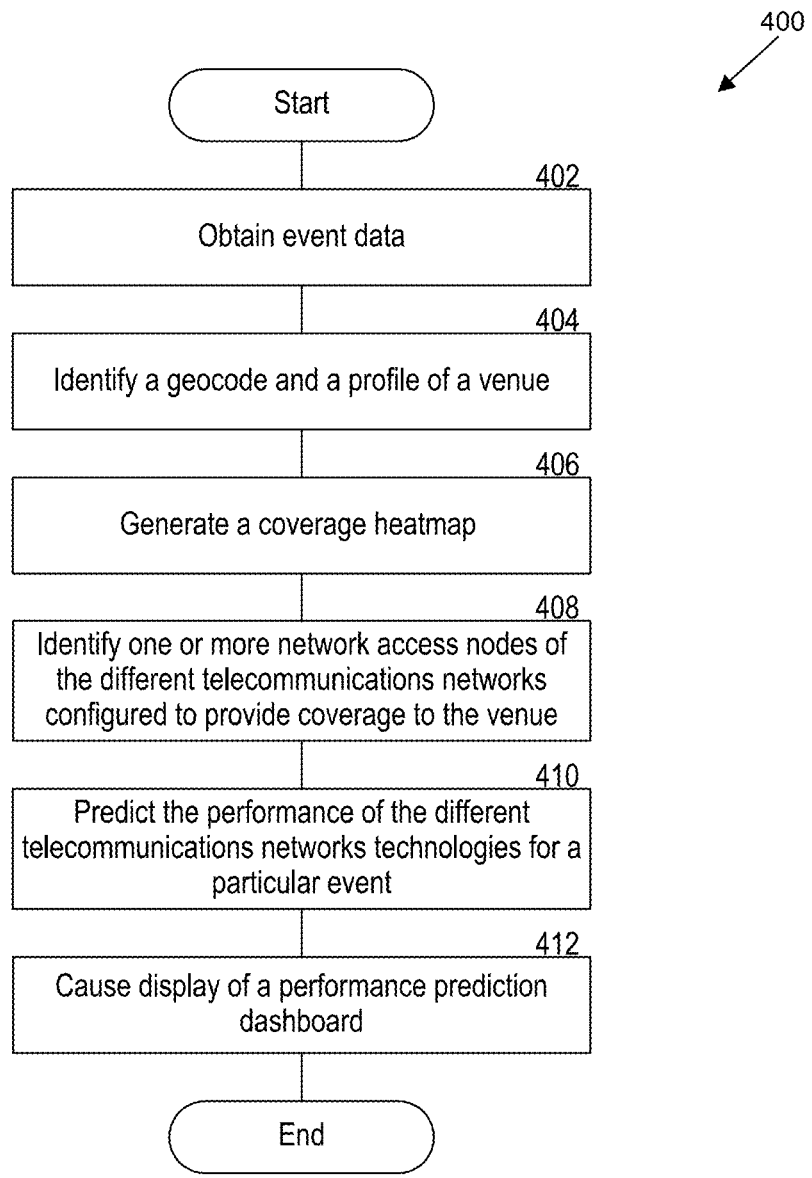
FIG. 4 is a flowchart that illustrates a process performed by a system to predict performance of different telecommunications networks at a venue for an event.

FIG. 4 is a flowchart that illustrates a process 400 performed by the system to predict the performance of different telecommunications networks at a venue corresponding to an event. For example, the system can predict the performance of different telecommunications networks at a venue when an event is scheduled to be held. The performance can be predicted by using various KPI data from NANs within a specific proximity of the venue. Furthermore, the system can weight the KPI data from the NANs based on subscriber density at the event providing a more accurate predicted performance at the venue during the event.

At 402, the system obtains event data. The event data can be obtained using a web scrapper or by aggregating data submissions to identify upcoming events. Furthermore, the event data can include information such as the particular venue where each event occurs (e.g., concert hall, stadium, or arena). The event data can also include the location of the venue and the time that the event is occurring.

At 404, the system identifies a geocode and a profile of a venue. The geocode can include geographic coordinates and a diagram of the venue. The geographic coordinates can point to the center of a venue. The diagram of the venue can be a floor plan. The diagram can be used to generate a heatmap that accurately represents areas expected to have poor telecommunications network coverage and signal quality.

At 406, the system generates a coverage heatmap. The heatmap can include network coverage of the venue by different telecommunications network technologies, where the coverage heatmap is generated based on measurements of signal characteristics from handset-reported data. For example, signal characteristics can be used to generate KPIs. The signal characteristics can only provide data at a high level for the whole coverage area. The system can weight the measurements based on bin density of a quantity of subscribers connected to the different telecommunications networks, therefore, allowing more granularity in the coverage heatmap.

At 408, the system identifies one or more NANs of the different telecommunications networks configured to provide coverage to the venue. The one or more NANs can be identified based on the geographic coordinates of the geocode or a best-server from the handset data. For example, NANs within a specific radius of the venue can be used to provide coverage to the venue. In addition, to confirm or identify NANs that provide coverage to the venue, the system can use handset-reported data to identify which NANs are serving the event.

At 410, the system predicts the performance of the different telecommunications network technologies for a particular event. The predicted performance can include values for one or more key performance indicators (KPIs) (e.g., values for throughput, latency, and jitter). Furthermore, the one or more KPIs can be weighted based on RRC-connected users of a quantity of subscribers at the particular event. By weighting based on RRC-connected users the aggregated performance prediction can be a more accurate representation of the performance observed by the customers.

The weighted RRC-connected user method of KPI aggregation can provide a number of benefits to the efficiency and usability of the system. For example, KPIs can be aggregated on the fly for any combination of NANs or times which can allow for event analysis to use dynamic filtering. In this example, the system only needs to store KPI information for aggregation and does not need to store the counters that make up the KPI. For example, some KPIs are made up of hundreds of counters. For example, it has been the historical custom to either gather the list of NANs that must be static and manually grouped or collect all of the counters to re-calculate the KPIs and aggregate the NANs and times. The RRC weighted method can avoid this and can save on processing speed and memory usage by a very large factor. Furthermore, the retrospective reporting can have multiple levels of aggregation to allow for an engineer to drill-down into the performance of an event. For example, a venue level can be a top level, the technology level can be the next level and the NAN level can be the bottom level.

At 412, the system causes display of a performance prediction dashboard which can include the coverage heatmap overlayed on the diagram of the venue, an indication of the predicted performance, and the values for the one or more KPIs. Furthermore, the performance prediction dashboard can include information relevant to the upcoming event including associated tags (e.g., extreme congestion scenario). The performance prediction dashboard can be used for further manual review or to identify events where intervention is required for good network performance.

Computer System

Figure 5:
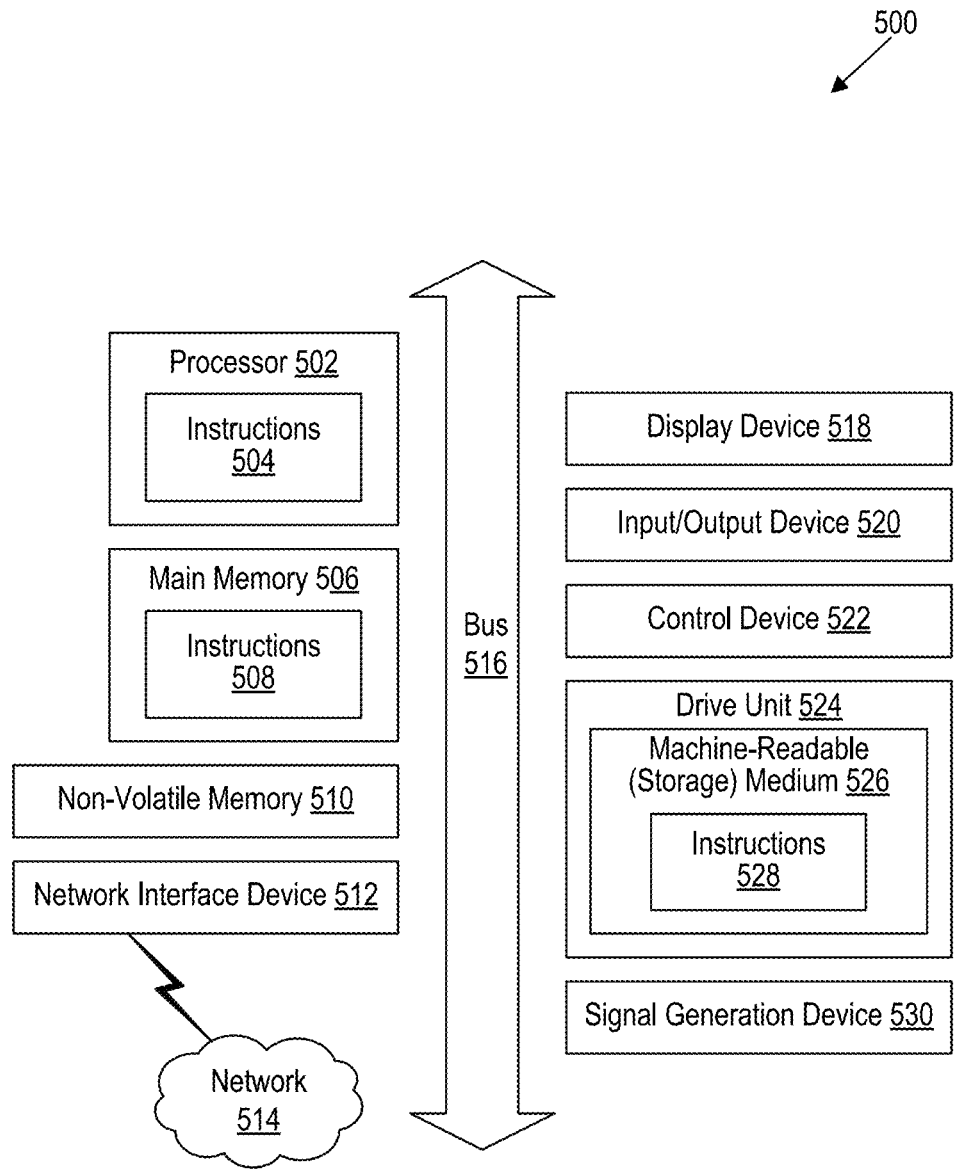
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed in parallel or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method performed by a system configured to predict performance of different telecommunications networks at a venue, the method comprising:
   obtaining event data that comprises an indication of one or more events,
      wherein each event occurs in a particular venue, at a particular location, and during a particular time;
   identifying a geocode and a profile of a venue,
      wherein the geocode includes geographic coordinates for the venue, and
      wherein the profile includes a diagram of the venue;
   generating a coverage heatmap that includes network coverage of the venue by different telecommunications network technologies,
      wherein the coverage heatmap is generated based on measurements of signal characteristics from handset-reported data, and
      wherein the measurements are weighted based on bin density of a quantity of subscribers connected to the different telecommunications networks;

identifying one or more network access nodes of the different telecommunications networks configured to provide coverage to the venue,
  wherein the one or more network access nodes are identified based on the geographic coordinates of the geocode;
predicting performance of the different telecommunications network technologies for a particular event indicated in the event data based on performance of the one or more network access nodes,
  wherein the predicted performance includes values for one or more key performance indicators (KPIs), and
  wherein the one or more KPIs are weighted based on radio resource control (RRC) users, and
  wherein the RRC-connected users include a bin density of a quantity of subscribers at the particular event; and
causing display, on a display device, of a performance prediction dashboard,
  wherein the performance prediction dashboard includes the coverage heatmap overlayed on the diagram of the venue, an indication of the predicted performance, or the values for the one or more KPIs.

2. The method of claim 1 further comprises:
identifying congestion scenarios at events based on a process including:
  establishing a threshold based on prior events at the geographic coordinates;
  determining an expected attendance at the particular event;
  determining that the expected attendance at the particular event will exceed the threshold; and
  tagging the particular event as a congestion scenario to prioritize manual review.

3. The method of claim 1, wherein predicting performance of the different telecommunications network technologies for the particular event comprises:
segmenting the diagram of the venue into one or more zones,
  wherein each zone in the one or more zones includes a portion of the diagram, and
  wherein each zone in the one or more zones is associated with one or more network access nodes; and
calculating performance metrics in each of the one or more zones by performing a process including:
  retrieving performance KPIs from each network access node of the one or more network access nodes;
  generating aggregated performance KPIs by aggregating the performance KPIs from each network access node of the one or more network access nodes; and
  weighting the aggregated performance KPIs using an RRC.

4. The method of claim 1 further comprising:
generating, after the particular event lapses, a performance review dashboard,
  wherein the performance review dashboard includes an actual coverage heatmap overlayed on the diagram of the venue, an actual performance metric, and the one or more KPIs.

5. The method of claim 1, wherein generating the measurements of signal characteristics for the coverage heatmap comprises:
identifying a busiest day,
  wherein the busiest day is a calendar date within a time period that represents the calendar date with a highest number of subscribers at a venue;
identifying KPI data for the busiest day or a comparable day; and
using the KPI data corresponding to the busiest day as the measurements for the coverage heatmap.

6. The method of claim 5, wherein identifying the KPI data for a most recent day includes weighting a reference signal received power (RSRP) sample based on the user density at the venue, wherein the RSRP sample is a received power level.

7. The method of claim 5, wherein identifying the KPI data for a most recent day includes weighting a signal-to-interference-plus-noise ratio (SINR) sample based on the user density at the venue, wherein the SINR sample is a theoretical maximum rate that information can be transferred between a wireless device and a Network Access Node.

8. The method of claim 5, wherein identifying the KPI data corresponding to the busiest day includes weighting throughput based on the busiest day at the venue, wherein the throughput is an actual rate at which information is transferred.

9. The method of claim 5, wherein identifying the KPI data corresponding to the busiest day includes weighting latency based on the busiest day at the venue, wherein the latency is a delay between a sender sending a packet and a receiver decoding it.

10. The method of claim 5, wherein identifying the KPI data corresponding to the busiest day includes weighting jitter based on the busiest day at the venue, wherein the jitter is a variation in packet delay at a receiver.

11. The method of claim 5, wherein identifying the KPI data corresponding to the busiest day includes weighting error rate based on the busiest day at the venue, wherein the error rate is a frequency at which errors occur in data transmission between a wireless device and a Network Access Node.

12. The method of claim 1 further comprising:
generating prospective aggregate performance KPIs by identifying a date of a recent network upgrade,
  wherein the recent network upgrade describes a modification to the network that results in a change to a KPI; and
increasing accuracy of the generated prospective performance summary based on KPI after the date of the recent network upgrade.

13. The method of claim 1, wherein obtaining event data that includes an indication of one or more events further comprises:
using a web scraper to identify events, wherein the web scraper is configured to:
  identifying a webpage that contains event data;
  extracting event details from the webpage,
    wherein the event details include information about an event contained in event data including the particular venue at the particular location and during the particular time;
generating a set of events based on the events that are occurring within a time period; and
storing the set of events as the event data.

14. The method of claim 1, wherein obtaining event data that includes an indication of one or more events further comprises:
aggregating data submissions to identify events by performing a process comprising:
  receiving events from multiple entities;
  generating a set of events based on the events from the multiple entities; and storing the set of events as the event data.

15. The method of claim 1, wherein identifying one or more network access nodes of the different telecommunications networks configured to provide coverage to the venue further comprises:
using handset-reported data,
wherein the handset-reported data is geolocated, and
wherein the handset-reported data is used to identify which network elements are serving the venue and identify the coverage in the venue.

16. At least one non-transitory computer-readable storage medium storing instructions, which, when executed by at least one data processor of a system, cause the system to:
obtain event data that includes an indication of one or more events,
wherein each event occurs in a particular venue at a particular location and during a particular time;
identify a geocode and a profile of a venue,
wherein the geocode includes geographic coordinates for the venue, and
wherein the profile includes a diagram of the venue;
generate a coverage heatmap that includes network coverage of the venue by different telecommunications network technologies,
wherein the coverage heatmap is generated based on measurements of signal characteristics from handset-reported data, and
wherein the measurements are weighted based on bin density of a quantity of subscribers connected to the different telecommunications networks or located in different parts of the venue;
identify one or more network access nodes of the different telecommunications networks configured to provide coverage to the venue,
wherein the one or more network access nodes are identified based on the geographic coordinates of the geocode;
predict performance of the different telecommunications network technologies for a particular event indicated in the event data based on performance of the one or more network access nodes,
wherein the predicted performance includes values for one or more key performance indicators (KPIs), and
wherein the one or more KPIs are weighted based on RRC users at the particular event.

17. The at least one non-transitory computer-readable storage medium of claim 16, wherein the system is further caused to:
identify traffic scenarios by causing the system to:
establish a threshold based on prior events at the geographic coordinates;
determine an expected attendance at the particular event; and
determine that the expected attendance at the particular event exceeds the threshold.

18. The at least one non-transitory computer-readable storage medium of claim 16, wherein to predict performance comprises causing the system to:
segment the diagram of the venue into one or more zones,
wherein each zone in the one or more zones includes a portion of the diagram, and
wherein each zone in the one or more zones includes one or more network access nodes; and
calculate performance metrics in each of the one or more zones by causing the system to:
retrieve performance data from each network access node of the one or more network access nodes;
generate aggregated performance data by aggregating the performance data from each network access node of the one or more network access nodes; and
weight the aggregated performance data using a radio resource control (RRC).

19. The at least one non-transitory computer-readable storage medium of claim 16, wherein the system is further caused to:
generate, after the particular event lapses, a performance review dashboard,
wherein the performance review dashboard includes an actual coverage heatmap overlayed on the diagram of the venue, an actual performance metric, or the one or more KPIs.

20. The at least one non-transitory computer-readable storage medium of claim 16, wherein generating the measurements of signal characteristics for the coverage heatmap comprises causing the system to:
identify a type of day,
wherein the type of day is a calendar date within a time period that represents the calendar date with a highest number of subscribers at a venue;
identifying the KPI data corresponding to the type of day; and
using the KPI data corresponding to the type of day as the measurements for the coverage heatmap.

* * * * *